United States Patent
Wang et al.

(10) Patent No.: US 10,804,790 B2
(45) Date of Patent: Oct. 13, 2020

(54) DETERMINING A TARGET VALUE FOR A SIGNAL INDICATING A CURRENT OR A VOLTAGE THROUGH PRIMARY-SIDE SWITCH BASED ON ANOTHER SIGNAL INDICATING A CURRENT OR A VOLTAGE THROUGH AN AUXILIARY WINDING ON A PRIMARY SIDE OF TRANSFORMER

(71) Applicant: Infineon Technologies Austria AG, Villach (AT)

(72) Inventors: Zan Wang, Singapore (SG); Wee Tar Richard Ng, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/151,839

(22) Filed: Oct. 4, 2018

(65) Prior Publication Data
US 2020/0112241 A1    Apr. 9, 2020

(51) Int. Cl.
*H02M 1/08* (2006.01)
*H02M 3/335* (2006.01)
*H02M 1/00* (2006.01)

(52) U.S. Cl.
CPC ......... *H02M 1/08* (2013.01); *H02M 3/33569* (2013.01); *H02M 3/33507* (2013.01); *H02M 3/33515* (2013.01); *H02M 3/33523* (2013.01); *H02M 2001/0048* (2013.01)

(58) Field of Classification Search
CPC .............. H02M 1/08; H02M 3/33569; H02M 2001/0048; H02M 3/33507; H02M 3/33515; H02M 3/33523

USPC ......... 363/21.12, 21.13, 21.15, 21.16, 21.17, 363/21.18
See application file for complete search history.

(56) References Cited

U.S. PATENT DOCUMENTS

| | | | |
|---|---|---|---|
| 9,698,695 B1 | 7/2017 | Fahlenkamp et al. | |
| 2008/0054847 A1* | 3/2008 | Elias | H02J 7/0075 320/130 |
| 2008/0164859 A1* | 7/2008 | Peng | H02M 3/157 323/318 |
| 2012/0081029 A1* | 4/2012 | Choi | H02M 3/33507 315/291 |

(Continued)

FOREIGN PATENT DOCUMENTS

| | | |
|---|---|---|
| CN | 104184349 A | 12/2014 |
| DE | 102015104569 A1 | 10/2015 |

(Continued)

*Primary Examiner* — Shawki S Ismail
*Assistant Examiner* — Demetries A Gibson
(74) *Attorney, Agent, or Firm* — Shumaker & Sieffert, P.A.

(57) ABSTRACT

In some examples, a controller is configured to control a primary-side switch in a power converter circuit, and the controller includes a first node configured to receive a first signal indicating a current or a voltage through a primary side of a transformer of the power converter circuit. The controller also includes a second node configured to receive a second signal indicating a current or a voltage through a primary-side switch of the power converter circuit. The controller further includes processing circuitry configured to determine a target value for the second signal based on the first signal and generate the control signal for the primary-side switch based on the target value for the second signal.

20 Claims, 5 Drawing Sheets

(56) References Cited

U.S. PATENT DOCUMENTS

| | | | |
|---|---|---|---|
| 2013/0003421 A1* | 1/2013 | Fang | H02M 3/33523 363/21.01 |
| 2015/0236597 A1* | 8/2015 | Hinz | H02M 1/08 363/21.17 |
| 2015/0264758 A1* | 9/2015 | McDougle | H05B 33/0815 315/307 |
| 2016/0056704 A1* | 2/2016 | Deboy | H02M 3/33592 363/21.13 |
| 2016/0226239 A1* | 8/2016 | Yang | H02M 1/32 |
| 2017/0093295 A1* | 3/2017 | Yao | H02M 3/33515 |
| 2017/0149340 A1* | 5/2017 | Ye | H02M 3/33507 |
| 2017/0366091 A1 | 12/2017 | Langeslag et al. | |
| 2017/0366092 A1 | 12/2017 | Langeslag et al. | |

FOREIGN PATENT DOCUMENTS

| | | |
|---|---|---|
| EP | 3258585 A1 | 12/2017 |
| EP | 3258586 A1 | 12/2017 |

\* cited by examiner

DETERMINING A TARGET VALUE FOR A SIGNAL INDICATING A CURRENT OR A VOLTAGE THROUGH PRIMARY-SIDE SWITCH BASED ON ANOTHER SIGNAL INDICATING A CURRENT OR A VOLTAGE THROUGH AN AUXILIARY WINDING ON A PRIMARY SIDE OF TRANSFORMER

TECHNICAL FIELD

This disclosure relates to power electronics.

BACKGROUND

A power converter circuit may receive electrical power from an alternating-current (AC) main supply (e.g., an electrical grid) and convert it to a lower direct-current (DC) voltage suitable to power an electrical load. The power converter circuit may include safety isolation between the input side (e.g., primary-side circuitry) and the output side (e.g., secondary-side circuitry). The regulating element of the power converter circuit (e.g., the primary controller) may be on the primary side, but the regulated parameter (e.g., the output voltage or the output current) may be available only on the secondary side of the power converter circuit.

Therefore, the power converter circuit may include some kind of communication media to send information from the secondary side to primary side. The power supply circuitry may include a safety isolation device (e.g., an optocoupler) for this purpose, but some other devices like capacitive- or transformer-based couplers are gaining popularity. For many types of devices for sending information, the signal may pass through the safety isolation, which may increase the system cost, may consume take space, and may reduce system reliability.

SUMMARY

This disclosure describes techniques a controller in a power converter circuit to generate for control signal for a primary-side switch in the power converter circuit. The controller may be configured to receive a first signal indicating a current or a voltage through a primary side of a transformer in the power converter circuit. The controller may also be configured to receive a second signal indicating a current or a voltage through the primary-side switch. The controller may be configured to modify a value of the second signal based on the first signal. The controller may be further configured to determine the control signal for the primary-side switch based on the target value for the second signal.

In some examples, a controller is configured to control a primary-side switch in a power converter circuit, and the controller includes a first node configured to receive a first signal indicating a current or a voltage through a primary side of a transformer of the power converter circuit. The controller also includes a second node configured to receive a second signal indicating a current or a voltage through a primary-side switch of the power converter circuit. The controller further includes processing circuitry configured to determine a target value for the second signal based on the first signal and generate the control signal for the primary-side switch based on the target value for the second signal.

This disclosure also describes a method for generating a control signal for a primary-side switch in a power converter circuit, where the method includes receiving, by a controller on a primary side of the power converter circuit, a first signal indicating a current or a voltage through a primary side of a transformer of the power converter circuit. The method also includes receiving, by the controller, a second signal indicating a current or a voltage through the primary-side switch. The method further includes determining, by the controller, a target value for the second signal based on the first signal and generating, by the controller, the control signal for the primary-side switch based on the target value for the second signal.

Furthermore, this disclosure describes a device including a computer-readable medium having executable instructions stored thereon, configured to be executable by processing circuitry for causing the processing circuitry to receive a first signal indicating a current or a voltage through a primary side of a transformer of a power converter circuit. The instructions further cause the processing circuitry to receive a second signal indicating a current or a voltage through a primary-side switch in the power converter circuit. The instructions also cause the processing circuitry to determine a target value for the second signal based on the first signal. In addition, the instructions cause the processing circuitry to generate a control signal for the primary-side switch based on the target value for the second signal.

The details of one or more examples are set forth in the accompanying drawings and the description below. Other features, objects, and advantages will be apparent from the description and drawings, and from the claims.

DETAILED DESCRIPTION

This disclosure describes devices, methods, and techniques for generating for control signal for a primary-side switch in a power converter circuit. A controller of the power converter circuit may be configured to generate the control signal based on based on a second signal received by the controller, where the second signal indicates a current or a voltage through the primary-side switch. The second signal may be referred to as a current-sense signal because the controller can sense the electrical current or voltage through the primary-side switch based on a level of the second signal. The controller may be configured to receive the second signal at a second node (e.g., one or more input-output nodes, pins, leads, pads, slugs, metal layers, or another type of node or nodes).

The controller is further configured to generate the control signal based on a target value for the second signal. The controller may be configured to determine the target value for the second signal based on a first signal received by the controller, where the first signal indicates a current or a voltage through a primary side of a transformer of the power converter circuit. The first signal may be referred to as a zero-crossing detection (ZCD) signal because the controller may be capable of sensing a zero crossing of an electrical current through the transformer based on the first signal (e.g., when an amplitude of the first signal crosses zero amplitude). The controller may be configured to receive the first signal at a first node (e.g., one or more input-output nodes, pins, leads, pads, slugs, metal layers, or another type of node or nodes).

By generating the control signal based on the target value for the second signal, the controller may be configured to control an output current of the power converter circuit. The controller may be capable of controlling the output current on the secondary side of the power converter circuit by controlling the operation of the primary-side switch, even without a safety isolation device configured to deliver information from the secondary side of the power converter circuit to the primary-side controller. There may be a limitation on the output current, such as eight, six, or five amperes, which the output current should not exceed. Generating a control signal based on a target value for the second signal using the techniques of this disclosure may be simpler and consume fewer processing resources, as compared to another controller that does not generate a control signal using the techniques of this disclosure.

A controller of this disclosure may be configured to implement a simple and reliable method for limiting the output current across a span of voltages, such as 3.3 volts to eleven volts. The output current limits may be part of limited power supply requirements. Using the techniques of this disclosure, the controller can avoid cycle-by-cycle computation of an offset value for the target value, which is especially undesirable at higher switching frequencies. The algorithms for generating the control signal described herein may consume relatively little memory space, as compared to some constant current algorithms.

A power converter circuit of this disclosure may be configured to operate in a power charger or power adapter device, such as a universal serial bus—power delivery (USB-PD) (e.g., a soft charging USB-PB adapter). A USB-PD device may operate across a wide output voltage range with a peak power limit such as forty watts. At a lower output voltage, such as three or four volts, the output current can be greater than a current limit, which may be five, six, or eight amperes.

The secondary-side controller in a power converter circuit may be configured to control the output current and output voltage and communicate to the primary-side controller of the power converter circuit. However, the secondary-side controller may fail, or the communication means by which the primary-side controller receives information from the secondary side may fail.

This disclosure describes an adaptive current limitation for the primary-side controller to control the primary-side switch such that the output current of the power converter circuit remains less than the current limit. The primary-side controller may be configured to cause an amplitude of the output current of the power converter circuit to be less than a limitation or a threshold level, such as five, six, or eight amperes.

In some examples, the primary-side controller may not receive a sensed signal from the secondary side indicating the output current, such as a signal received via an optocoupler or another galvanic isolation device. In another power converter circuit, the secondary-side controller may be configured to perform computation and transmit signals to the primary-side controller through a galvanic isolation device. A controller of this disclosure signal may not need an optocoupler or other galvanic isolation device to maintain the output current at a level that is less than the output current limitation.

Figure 1:
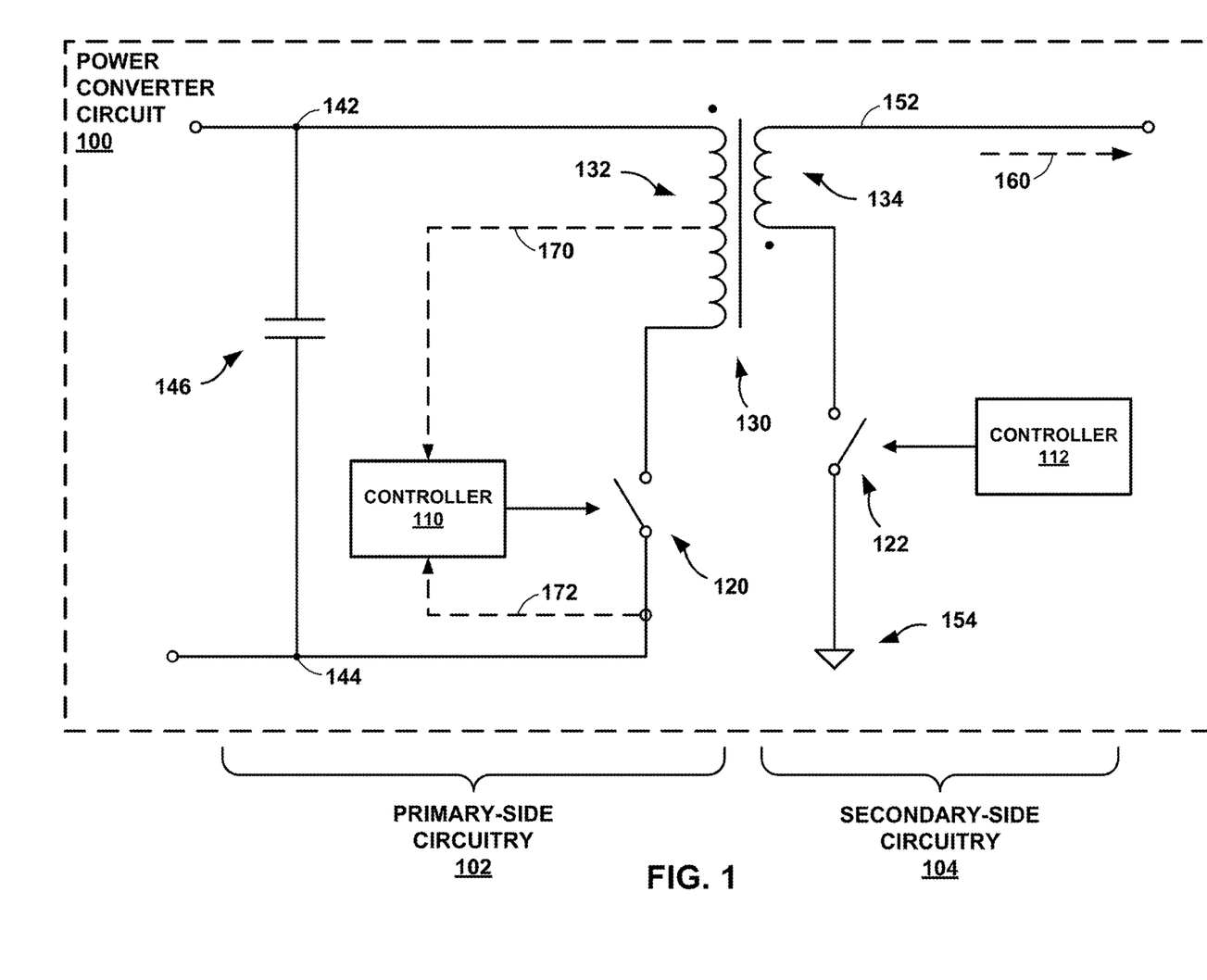
FIG. 1 is a circuit diagram of a power converter circuit, in accordance with some examples of this disclosure.
Figure 4:
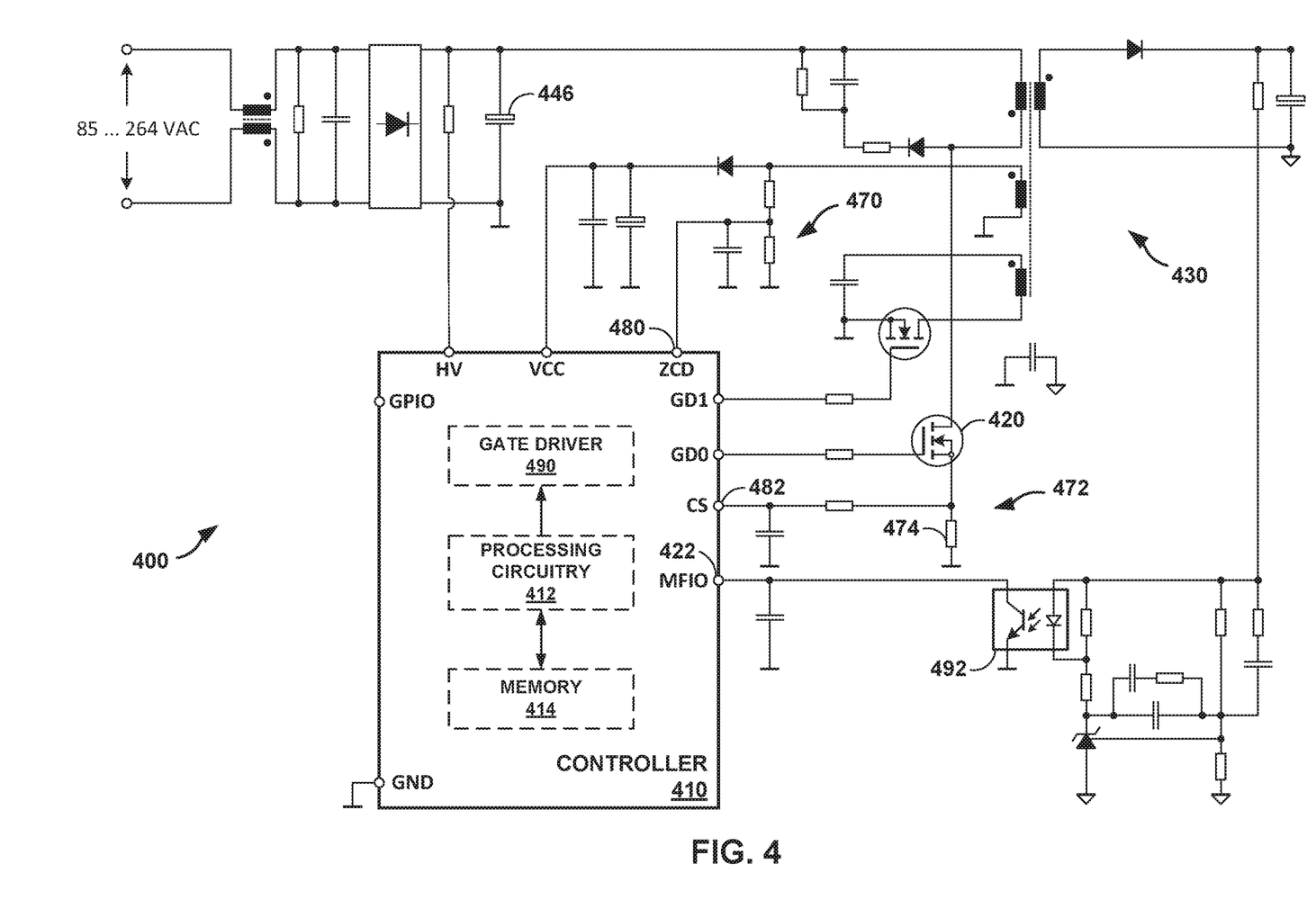
FIG. 4 is a schematic circuit diagram of a power converter circuit, in accordance with some examples of this disclosure.

FIG. 1 is a circuit diagram of a power converter circuit 100 including primary-side circuitry 102 and secondary-side circuitry 104, in accordance with some examples of this disclosure. Power converter circuit 100 may include a power conversion device, an analog electrical device, an embedded system, an integrated circuit (IC) device, a motor driver circuit, and/or any other electrical device. In some examples, power converter circuit 100 may include an alternating-current-to-direct-current (AC/DC) conversion device, a DC/DC conversion device, and/or any other conversion device. In some examples, power converter circuit 100 may include a flyback conversion circuit, a buck conversion circuit, a boost conversion circuit, a buck-boost conversion circuit, a resonant-mode conversion circuit, a half-bridge circuit, an H-bridge circuit, and/or other conversion circuit. Power converter circuit 400 shown in FIG. 4 is an example of power converter circuit 100.

Primary-side circuitry 102 includes primary controller 110 (i.e., primary-side controller 110), primary-side switch 120, primary winding 132 of transformer 130, voltage rails 142 and 144, and capacitor 146. Primary-side circuitry 102 may be configured to receive electrical power through a rectification circuit. The rectification circuit may be configured to convert AC electricity from, for example, an electrical grid to DC electricity and deliver the DC electricity to high-side voltage rail 142 and low-side voltage rail 144. Capacitor 146 may be configured to smooth the voltage difference between voltage rails 142 and 144 by at least transmitting higher-frequency signals and blocking lower-frequency signals between voltage rails 142 and 144. Voltage rails 142 and 144 may be configured to deliver DC electricity to primary-side switch 120 and primary winding 132.

Secondary-side circuitry 104 includes secondary-side controller 112, secondary-side switch 122, secondary winding 134 of transformer 130, and voltage rails 152 and 154. Secondary-side circuitry 104 may be configured to receive electrical power through secondary winding 134. Secondary winding 134 may be configured to deliver electricity to high-side voltage rail 152. Secondary-side circuitry 104 may include a capacitor to smooth the voltage difference between voltage rails 152 and 154 by at least transmitting higher-frequency signals and blocking lower-frequency signals between voltage rails 152 and 154. Secondary-side circuitry 104 generates output current 160 to deliver to an electrical load.

Figure 3:
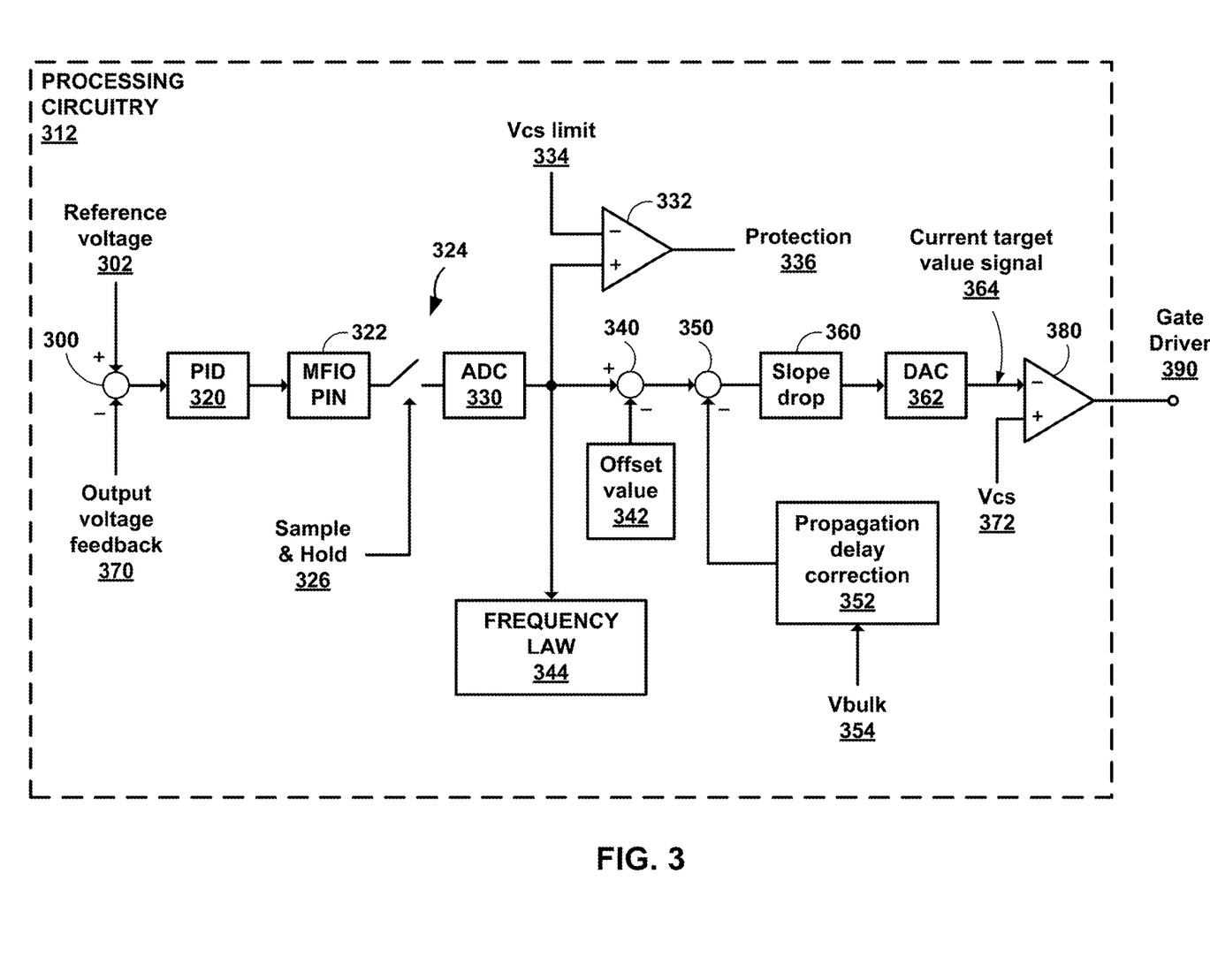
FIG. 3 is a conceptual block diagram of the generation of a control signal for a switch, in accordance with some examples of this disclosure.

Primary controller 110 may be configured to control the operations of primary-side switch 120 by delivering control signals to a control terminal of primary-side switch 120. Controller 410 shown in FIG. 4 is an example of controller 110, and primary-side switch 420 shown in FIG. 4 is an example of primary-side switch 120. Processing circuitry 312 and 412 shown in FIGS. 3 and 4 are examples of processing circuitry that primary controller 110 can include. Secondary controller 120 may be configured to control the operations of secondary-side switch 122 by delivering control signals to a control terminal of secondary switch 122.

Switches 120 and 122 may be power switches such as, but not limited to, any type of field-effect transistor (FET), a bipolar junction transistor (BJT), an insulated-gate bipolar transistor (IGBT), a high-electron-mobility transistor (HEMT), a gallium-nitride (GaN) based transistor, and/or another element that uses voltage for its control. Switches 120 and 122 may include n-type transistors or p-type transistors and may be power transistors. In some examples, switches 120 and 122 may be vertical transistors, lateral transistors, and/or horizontal transistors. In some examples, switches 120 and 122 may include other analog devices such as diodes and/or thyristors. Switches 120 and 122 may also include a freewheeling diode connected in parallel with a transistor to prevent reverse breakdown of the transistor. In some examples, the switches 120 and 122 may operate as switches and/or as analog devices.

In some examples, each of switches 120 and 122 may include three terminals: two load terminals and a control terminal. For MOSFET switches, switches 120 and 122 may include a drain terminal, a source terminal, and at least one gate terminal, where the control terminals are gate terminals. For BJT switches, control terminals may be base terminals. Current may flow between the load terminals of switches 120 and 122, based on the voltage at control terminals.

Switches 120 and 122 may include various material compounds, such as silicon (Si), silicon carbide (SiC), Gallium Nitride (GaN), or any other combination of one or more semiconductor materials. To take advantage of higher power density requirements in some circuits, power converter circuits may operate at higher frequencies. In some examples, silicon carbide switches may experience lower power losses from switching. Improvements in magnetics and faster switching, such as gallium nitride switches, may support higher frequency converters. These higher frequency circuits may require control signals to be sent with more precise timing, as compared to lower-frequency circuits. In some examples, power converter circuit 100 may be configured to operate at switching frequencies of one hundred kilohertz, two hundred kilohertz, fifty kilohertz, and/or any other suitable frequency.

Controllers 110 and 112 may be configured to configured to deliver control signals and/or driver signals to the control terminals of switches 120 and 122 to control the flow of electricity between the load terminals of switches 120 and 122. The control signals delivered by controllers 110 and 112 may be square waveforms with an enabling period and a non-enabling period. The enabling period of a control signal, for example, may be the period of time during which the control signal enables a respective switch to conduct electricity between the load terminals of the respective switch. A controller may be configured to deliver and sustain an enabling control signal or a non-enabling control signal for a time interval such as a ringing time or a charging time. In some examples, a control signal may be referred to as one or more control signals that last for a certain amount of time. There may be time intervals during which controllers 110 and 112 cause zero, one, or both of switches 120 and 122 to conduct electricity.

In controlling the operation of primary-side switch 120, primary controller 110 may experience a first scenario with a low-line input voltage, low output voltage, and heavy load and a second scenario with a high-line input voltage and low output voltage. Primary controller 110 may be configured to operate in continuous current mode (CCM) in the first scenario and operate in discontinuous current mode (DCM) with zero voltage switching in the second scenario to improve efficiency.

Primary controller 110 is configured to receive a first signal indicating a current or a voltage through primary winding 132 via sensing means 170. Primary controller 110 may be able to monitor the voltage level at the output of secondary-side circuitry 104 based on the amplitude of the first signal. That is, the amplitude of the first signal may indicate the output voltage level of secondary-side circuitry 104. Primary controller 110 is also configured to receive a second signal indicating a current or a voltage through primary switch 120 via sensing means 172. Sensing means 170 and 172 may also include circuit elements such as resistors, capacitors, diodes, and nodes on primary controller 110. Sensing means 470 and 472 and nodes 480 and 482 shown in FIG. 4 are examples of sensing means 170 and 172.

In accordance with the techniques of this disclosure, primary controller 110 may be configured to determine a target value for the second signal based on the first signal. Primary controller 110 may be configured to determine an offset value for the target value based on a function that includes the first signal as an input variable. Primary controller 110 may be configured to determine the offset value for the target value based on the first signal, thereby adjusting the target value as the first signal changes.

Primary controller 110 may be configured to add or subtract the offset value to or from a sampled version of the first signal to determine the target value for the second signal. In some examples, primary controller 110 is configured to generate the control signal for primary-side switch 120 based on comparing a sensed value of the second signal to the target value. Comparator 380 shown in FIG. 3 is example of how primary controller 110 can compare a sensed value of the second signal to the target value. Controller 110 may be configured to use peak current control for the electrical current through primary-side switch 120.

Figure 2A:
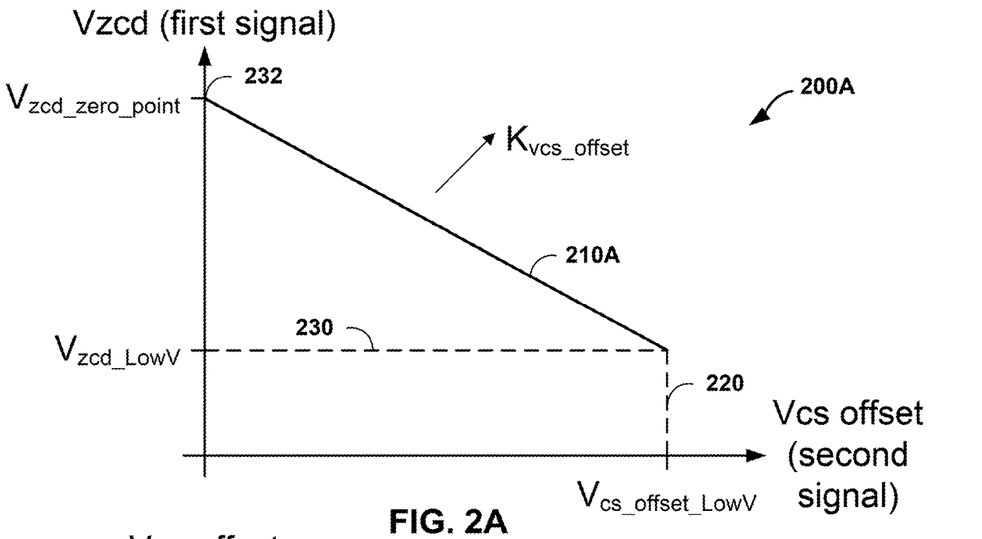
FIGS. 2A and 2B are graphs of values of a first signal and an offset value for a target value, in accordance with some examples of this disclosure.
Figure 2B:
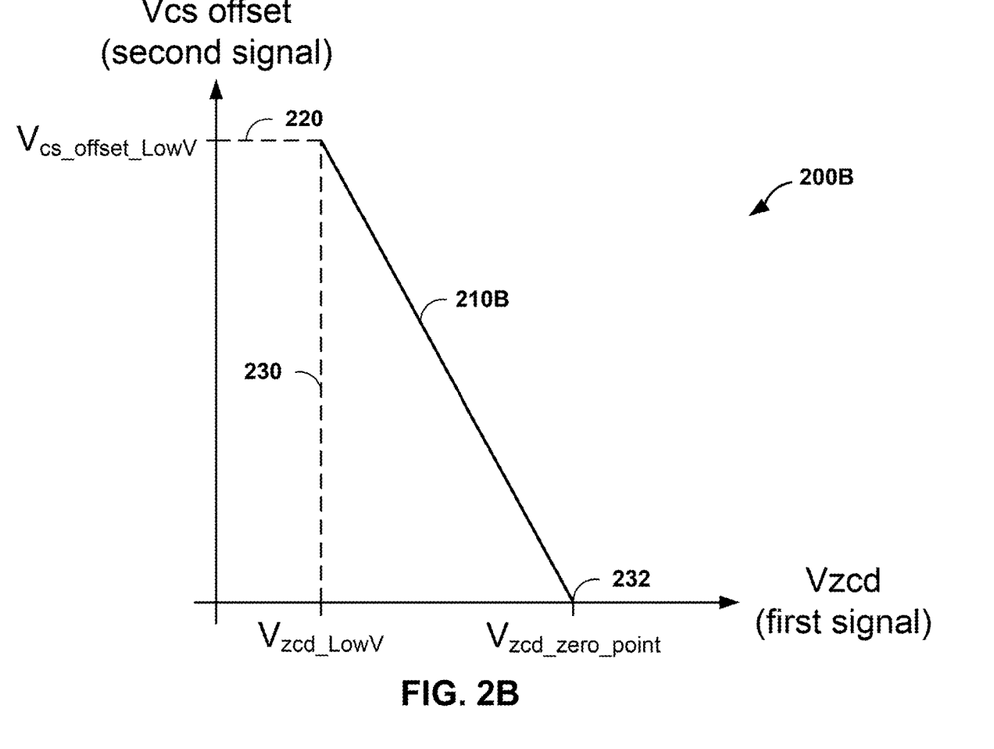

FIGS. 2A and 2B are graphs 200A and 200B of values of a first signal and an offset value for a target value, in accordance with some examples of this disclosure. In graphs 200A and 200B, values of the first signal are labeled "Vzcd" and the offset values for the target value are labeled "Vcs offset." Graphs 200A and 200B have the same values, but graph 200B is rotated ninety degrees with respect to graph 200A. Graph 200B shows the first signal as the independent variable and the offset value for the target value as the dependent variable for the function of the first signal and the offset value.

Controller 110 may be configured to determine the gradient of lines 210A and 210B based on Equation (1) shown below. In Equation (1), $K_{Vcs\_offset}$ represents the gradient of line 210A and the inverse of the gradient of line 210B. $Vcs_{offset\_LowV}$ in Equation (1) is maximum value 220 of the offset value $Vcs_{offset}$. $Vzcd_{LowV}$ is value 230 of the first signal that is associated with the maximum value of the offset value. $Vzcd_{zero\_point}$ is value 232 of the first signal that is associated with a zero value of the offset value.

$$k_{Vcs_{offset}} = (Vcs_{offset_{LowV}})/(Vzcd_{LowV} - Vzcd_{zero\_point})) \qquad (1)$$

In some examples, controller 110 is configured to receive a user input and determine the gradient of lines 210A and/or 210B based on the user input. Additionally or alternatively, controller 110 may be configured to determine values 220, 230, and 232 based on user inputs received by controller 110. After determining values 220, 230, and 232, controller 110 may be configured to determine the gradient (e.g., $K_{Vcs\_offset}$) based on values 220, 230, and 232. The user may be able to set the output current limit or the output voltage limit for power converter circuit 100, and controller 110 may be configured to determine values 220, 230, and 232 and the gradient based on the output current limit or the output voltage limit.

Controller 110 may be configured to determine a gradient for a function (e.g., Equation (2)) including the first signal (e.g., Vzcd in Equation (2) below) as an input variable. Controller 110 can determine the gradient first and then determine values 220, 230, and 232, or controller 110 can determine values 220, 230, and 232 first and then determine the gradient, as shown in Equation (1). In some examples, controller 110 is configured to determine a limit for output current 160 and determine the gradient of the function based on the limit.

Controller 110 may be configured to determine an offset value for the target value based on Equation (2). $Vcs_{offset}$ in Equation (2) represents the offset value for the target value. Using Equation (2), controller 110 may be configured to determine a larger offset value (e.g., a larger modification for the target value) in a first instance when first signal includes value 230 than in a second instance when the first signal includes value 232.

$$Vcs_{offset} = (Vzcd_{zero\,point} - Vzcd) \times k_{Vcs_{offset}} \quad (2)$$

Controller 110 may be configured to determine a target value for the second signal based on the offset value, as shown in FIG. 3. In examples in which the first signal has a higher value, controller 110 may be configured to modify the target value for the second signal by a smaller amount, as compared to the modification of the target value for examples in which the first signal has a lower value. In examples in which the value of Vzcd (e.g., the first signal) is equal to the zero point, controller 110 may be configured to determine an offset value equal to zero. Controller 110 can implement Equation (2) as a linear compensation scheme by using the first signal received via sensing means 170. In some examples, controller 110 can implement a complex compensation scheme, an exponential compensation scheme, a logarithmic compensation scheme, and/or any other suitable compensation scheme.

As an example, controller 110 can set value 220 to eighty millivolts. Value 220 in graphs 200A and 200B represents the maximum offset value. Controller 110 can set value 230 to 1.25 volts, which may correspond to an output voltage of five volts, which may be a relatively low output voltage for power converter circuit 100. Controller 110 can set value 232 to 2.75 volts, which may correspond to an output voltage of eleven volts, which may be a relatively high output voltage for power converter circuit 100. Controller 110 may be configured to determine a gradient of negative 0.0533 based on Equation (1).

As an alternative to Equations (1) and (2) shown above, a controller in another power converter circuit may implement Equation (3) to control the output current of a power converter circuit. In Equation (3) shown below, $I_{out}$ is the output current, $I_{sec\_pk}$ is the secondary peak current, $T_{reset}$ is the transformer reset time, and $T_{period}$ is the switching period. The reset time divided by the switching period may be equal to the duty cycle of the control signal for primary-side switch 120.

$$I_{out} = 1/2 \times I_{secondary\,peak} \times \frac{T_{reset}}{T_{period}} \quad (3)$$

Equation (3) is an example of a constant current control technique. A controller implementing Equation (3) may include additional hardware to measure the reset time, which can increase cost and the size of the controller as compared to controller 110 shown in FIG. 1. Implementing Equation (3) also requires multiplication and division, whereas Equation (2) only has multiplication for less intensive computation. Additional tuning exercise for the other controller may be needed to use Equation (3) to control the output current. Equation (3) may involve cycle-by-cycle computation of the estimated output current, which cannot possible at a switching frequency of, for example, 140 kilohertz.

By using Equations (1) and (2), controller 110 does not need to determine the offset value every switching cycle. Moreover, the determination of the offset value by controller 110 may not be timing critical. Controller 110 may be configured to determine a new offset value at a regular interval, such as once per millisecond. The frequency of determining a new offset value may be much less than the switching frequency, which may be in the tens or hundreds of kilohertz. As shown by offset value block 342 in FIG. 3, controller 110 may be configured to determine a target value for the second signal based on the offset value for every switching cycle.

Thus, controller 110 can use fewer processing resources by determining a new offset value less often than every switching cycle and determining a new gradient even less often than determining the new offset value. In some examples, controller 110 may be configured to determine the gradient once for the operation of power converter circuit 100, or controller 110 may be configured to periodically determine a new gradient value.

FIG. 3 is a conceptual block diagram of the generation of a control signal for a switch, in accordance with some examples of this disclosure. Processing circuitry 312 may be an element of controller 110 shown in FIG. 1. Output voltage feedback 370 is an example of the output signal of power converter circuit 100 (e.g., the voltage level at the node where power converter circuit 100 generates output current 160) received by controller 110 shown in FIG. 1. Processing circuitry 312 may be configured to receive output voltage feedback 370 via an optocoupler, a transformer, or another means of galvanic isolation (e.g., optocoupler 492 and pin 422 shown in FIG. 4). Output voltage feedback 370 may indicate a current or a voltage through a primary side of a transformer of a power converter circuit.

Processing circuitry 312 may be configured to subtract reference voltage 302 from output voltage feedback 370 at adder 300. The output of adder 300 may be an error signal that indicates the difference between output voltage feedback 370 and reference voltage 302. Processing circuitry 312 may be configured to determine a sum of a proportional signal, an integrated signal, and a derivative signal based on the error signal at proportional integral derivative (PID) block 320. Processing circuitry 312 may be configured to convert the output of block 320 to a matching signal at multi-function input-output (MFIO) pin 322.

Processing circuitry 312 may be configured to deliver sample and hold signal 326 to control switch 324. Processing circuitry 312 can close switch 324 once every switching cycle to sample the first signal. In some examples, processing circuitry 312 is configured to close switch 324 during an off-period of a primary-side switch controlled by processing circuitry 312. Processing circuitry 312 can close switch 324 for a time duration such as one or two microseconds or any other suitable time duration. Processing circuitry 312 may be configured to use lead-edge blanking to delay the closing of switch 324 in order to avoid sampling spikes in the sampled signal.

Analog-to-digital converter (ADC) 330 may be configured to convert the sampled signal to a digital value. In some examples, ADC 330 may have a resolution of six, eight, nine, ten, or twelve bits. At frequency block 344, processing circuitry 312 may be configured to determine the switching frequency and current command (e.g., a target value) based on the voltage at MFIO pin 322. For example, ADC 330 may have a resolution of eight bits such that an output of ADC 330 can range from zero to two hundred and fifty-five. The input values at ADC 330 may range from zero to 2.4 volts. The values of the first signal may range from two hundred millivolts to six hundred millivolts. The values at MFIO pin 322 may range from four hundred millivolts to 2.4 volts.

Processing circuitry 312 may be configured to compare the digital value to Vcs limit 334 at comparison block 332. In examples in which the digital value is greater than Vcs limit 334, processing circuitry 312 may be configured to generate protection signal 336. In some examples, processing circuitry 312 can select Vcs limit 334 based on the input voltage of the power converter circuit. For example, in examples in which the input voltage has a higher level, processing circuitry 312 can set Vcs limit 334 equal to four hundred and ninety millivolts. In examples in which the input voltage has a lower level, processing circuitry 312 can set Vcs limit 334 equal to six hundred millivolts.

Processing circuitry 312 may be configured to apply offset value 342 to the digital value at adder block 340. Processing circuitry 312 can apply offset value 342 by subtracting offset value 342 from the digital value or by adding offset value 342 and the digital value. Processing circuitry 312 may be configured to determine offset value 342 based on Equation (2) described above with respect to graphs 200A and 200B.

In examples in which the value or amplitude of the first signal is relatively small, processing circuitry 312 may be configured to determine a larger offset value for the target value for the second signal. In examples in which the value or amplitude of the first signal is relatively large, processing circuitry 312 may be configured to determine a smaller offset value for the target value for the second signal. Without offset value 342 and adder block 340, processing circuitry 312 can generate a control signal, but the duty cycle, value, amplitude, or another characteristic of the control signal may differ from the control signal generated using offset value 342 and adder block 340.

Processing circuitry 312 may be configured to determine propagation delay correction 352 based on bulk voltage 354 and to subtract propagation delay correction 352 from the output value of adder block 340. Propagation delay correction 352 may be based on the turn-off delay for the primary-side switch.

Processing circuitry 312 may be configured to compensate for CCM at slope drop block 360 based on the output value of adder block 350. Processing circuitry 312 may operate in CCM when the duty cycle of the control signal for the primary-side switch is greater than fifty percent. The control of the primary-side switch in CCM by processing circuitry 312 may not be stable without compensation at slope drop block 360. Processing circuitry 312 may be configured to convert the output value of slope drop block 360 to an analog value at digital-to-analog converter (DAC) 362. DAC 362 may have the same resolution as ADC 320.

Current sense voltage (Vcs) 372 is an example of a second signal received by controller 110 via sensing means 172 shown in FIG. 1 and a second signal received by controller 410 via node 482 shown in FIG. 4. Current sense voltage 372 may indicate the peak amplitude of the electrical current through the primary-side switch, which is proportional to the peak amplitude of the output electrical current of the power converter circuit. The proportion of the electrical current through the primary-side switch to the output electrical current may be based on the turns ratio of the transformer.

The output signal from DAC 362 is current target value signal 364. Current target value signal 364 can function as a target value for Vcs 372 (e.g., a second signal) such that processing circuitry 312 determines a control signal for the primary-side switch based on a comparison of current target value signal 364 and Vcs 372. In response to determining that Vcs 372 is greater than current target value signal 364, comparator 380 may be configured to output an active control signal to turn on the primary-side switch. In response to determining that Vcs 372 is less than current target value signal 364, comparator 380 may be configured to output an inactive control signal to turn off the primary-side switch. Processing circuitry 312 may be configured to deliver the control signal from comparator 380 to gate driver 390 to generate a higher-power control signal (e.g., a driver signal).

FIG. 4 is a schematic circuit diagram of a power converter circuit 400, in accordance with some examples of this disclosure. Power converter circuit 400 includes controller 410, primary-side switch 420, transformer 430, capacitor 446, sensing means 470 and 472, optocoupler 492, and other components not labeled. Controller 410 includes processing circuitry 412, memory 414, and gate driver 490. Although FIG. 4 depicts memory 414 and gate driver 490 as integrated within controller 410, memory 414 and/or gate driver 490 may be components that are external to controller 410 in some examples. Some or all of the components shown in FIG. 4 may be mounted on one or more printed circuit boards.

Sensing means 470 is coupled to the primary side of transformer 430 and configured to deliver a first signal to ZCD pin 480 of controller 410. The first signal indicates a current or a voltage through a primary side of transformer 430. ZCD pin 480 is an example of a first node of controller 410 and may have functions such as detecting zero crossings of a signal through the primary side of transformer 430, detecting the input voltage of power converter circuit 400, and/or detecting the output voltage of power converter circuit 400. In the example of FIG. 4, sensing means 470 includes a resistive divider and a capacitor coupled to ground, although other configurations are possible.

Sensing means 472 is coupled to primary-side switch 420 and configured to deliver a second signal to current sense pin 482 of controller 410. The second signal indicates a current or a voltage through primary side switch 420. Current sense pin 482 is an example of a second node of controller 410. In the example of FIG. 4, sensing means 470 includes a current-sense resistor 474, a resistor between primary-side switch 420 and current sense pin 482, and a capacitor coupled to ground and to current sense pin 482, although other configurations are possible.

Controller 410 may be configured to receive information from the secondary side of power converter circuit 400 at MFIO pin 422. Controller 110 receives the information via optocoupler 492, which may provide galvanic isolation between the primary side and the secondary side of power converter circuit 400. MFIO pin 422 may be configured to operate as a universal asynchronous receiver-transmitter (UART) pin. However, if optocoupler 492 malfunctions, controller 410 can generate a control signal for primary-side switch 420 based on the signals received at nodes 480 and 482. Controller 410 may be configured to control the output current of power converter circuit 400 based on the signals received at nodes 480 and 482, even in the absence of information received at MFIO pin 422. Pins 422, 480, and/or 482 of controller 410 may include one or more input-output nodes, pins, leads, pads, slugs, metal layers, or another type of node or nodes.

Figure 5:
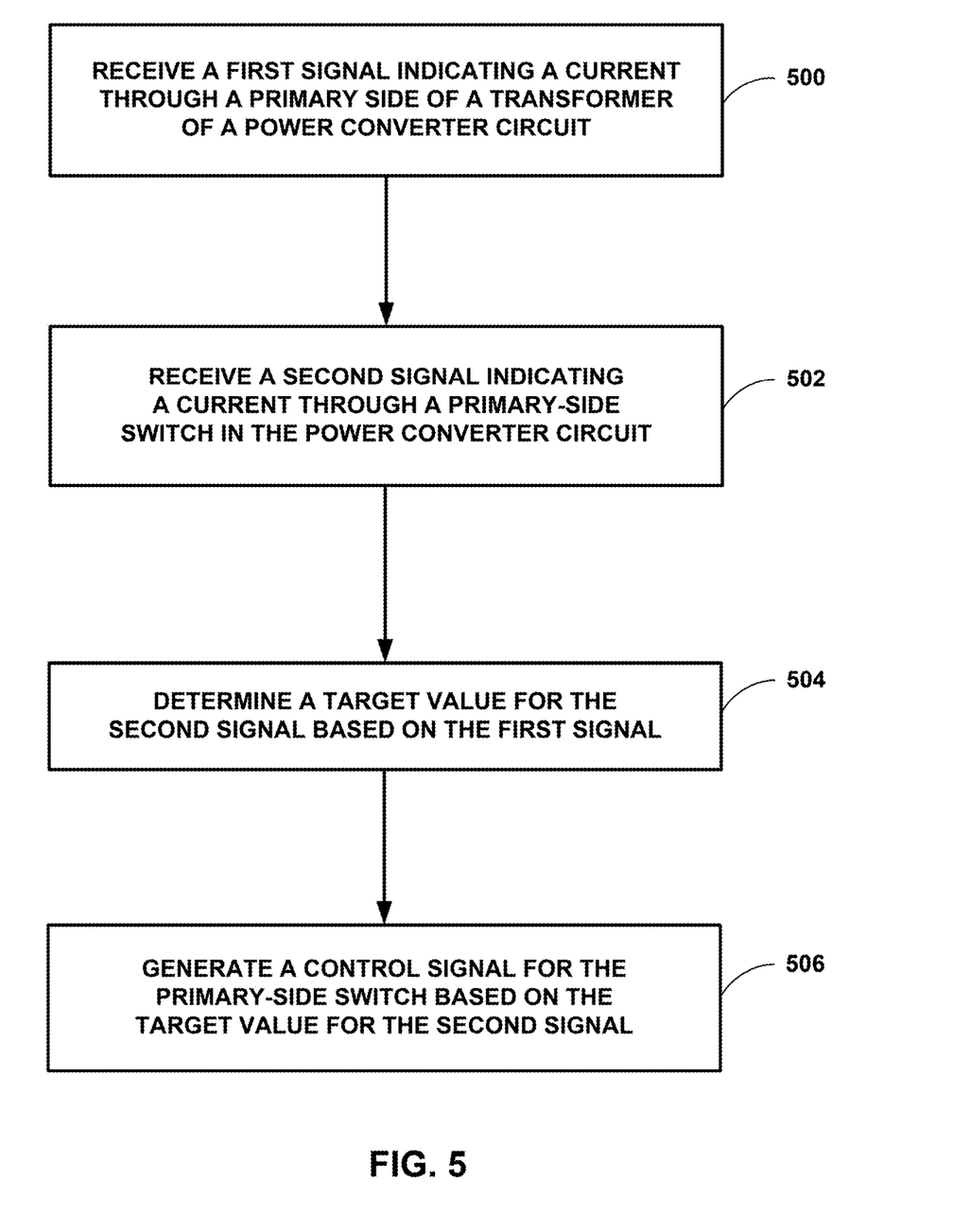
FIG. 5 is a flow diagram illustrating example techniques for generating a control signal for a primary-side switch, in accordance with some examples of this disclosure.

FIG. 5 is a flowchart illustrating example techniques for generating a control signal for a primary-side switch, in accordance with some examples of this disclosure. The techniques of FIG. 5 are described with reference to controller 110 shown in FIG. 1, although other components, such as processing circuitry 312 and 412 shown in FIGS. 3 and 4 and controller 410 shown in FIG. 4, may exemplify similar techniques.

In the example of FIG. 5, controller 110 receives, at a first node via sensing means 170, a first signal indicating a current or a voltage through primary winding 132 of transformer 130 (500). Controller 110 may be configured to sample the first signal while primary-side switch 120 is turned off. When primary-side switch 120 is turned off, the value or amplitude of the first signal may provide an indication of output current 160 or an output voltage signal of power converter circuit 100. Sensing means 170 may include a divider circuit to reduce the amplitude of the first signal to a level that is acceptable for controller 110, such as less than three, four, or five volts.

In the example of FIG. 5, controller 110 receives, at a second node via sensing means 172, a second signal indicating a current or a voltage through primary-side switch 120 (502). Controller 110 determines a target value for the second signal based on the first signal (504). The target value for the second signal may be a set point, a command, or a desired value for the second signal. Controller 110 may include a comparator (see, e.g., comparator 380 shown in FIG. 3) configured to compare a sensed value of the second signal to the target value for the second signal. In examples in which the amplitude of the second signal is greater than the target value for the second signal, controller 110 may be configured to turn on primary-side switch 120. In examples in which the amplitude of the second signal is less than the target value for the second signal, controller 110 may be configured to turn on primary-side switch 120.

In the example of FIG. 5, controller 110 generates a control signal for primary-side switch 120 based on the target value for the second signal (506). The control signal may include a PWM signal with a duty cycle based on the amplitude of the second signal. Controller 110 may be configured to generate the control signal by comparing the second signal to the target value signal. Controller 110 may include a gate driver configured to generate a driver signal based on the control signal, where the driver signal has higher power than the control signal.

The following numbered examples demonstrate one or more aspects of the disclosure.

Example 1. A controller is configured to control a primary-side switch in a power converter circuit, and the controller includes a first node configured to receive a first signal indicating a current or a voltage through a primary side of a transformer of the power converter circuit. The controller also includes a second node configured to receive a second signal indicating a current or a voltage through a primary-side switch of the power converter circuit. The controller further includes processing circuitry configured to determine a target value for the second signal based on the first signal and generate the control signal for the primary-side switch based on the target value for the second signal.

Example 2. The controller of example 1, where the processing circuitry is configured to control an output current of the power converter circuit at least in part by generating the control signal.

Example 3. The controller of examples 1-2 or any combination thereof, where the processing circuitry is further configured to determine an offset value based on a function including the first signal as an input variable.

Example 4. The controller of examples 1-3 or any combination thereof, where the processing circuitry is configured to determine the target value for the second signal based on the offset value.

Example 5. The controller of examples 1-4 or any combination thereof, where the processing circuitry is further configured to determine a limit for an output current of the power converter circuit and determine a gradient of the function based on the limit.

Example 6. The controller of examples 1-5 or any combination thereof, where the processing circuitry is further configured to determine a limit for an output current of the power converter circuit and determine a gradient of the function based on the limit.

Example 7. The controller of examples 1-6 or any combination thereof, where the processing circuitry is further configured to determine a gradient of the function at least in part by associating a first value of the first signal with a zero value for the offset value, and associating a second value of the first signal with maximum value of the offset value, and determining the gradient based on the first value of the first signal, the zero value for the offset value, the second value of the first signal, and the maximum value of the offset value.

Example 8. The controller of example 7, where the processing circuitry is further configured to determine the target value for the second signal at least in part by determining a larger modification for the second signal in a first instance when first signal includes the first value than in a second instance when the first signal includes the second value.

Example 9. The controller of examples 7-8 or any combination thereof, where the first value of the first signal is greater than the second value of the first signal.

Example 10. The controller of examples 7-9 or any combination thereof, where the processing circuitry is configured to determine the zero value of the offset value, the maximum value of the offset value, the first value of the first signal, or the second value of the first signal based on the user input.

Example 11. The controller of examples 1-10 or any combination thereof, where the processing circuitry is configured to determine the offset value based on the function at least in part by determining the offset value such that the offset value and the first signal are inversely proportional.

Example 12. The controller of examples 1-11 or any combination thereof, where the processing circuitry is configured to determine the target value for the second signal at least in part by adding the offset value to the first signal or subtracting the offset value from the first signal.

Example 13. The controller of examples 1-12 or any combination thereof, where the processing circuitry is further configured to sample the first signal while the primary-side switch is turned off, and the processing circuitry is configured to determine the target value for the second signal based on the sampled first signal.

Example 14. The controller of examples 1-13 or any combination thereof, where the processing circuitry is further configured to determine a threshold level based on the target value for the second signal, and the processing circuitry is configured to generate the control signal at least in part by turning off the primary switch when the second signal is greater than the threshold level.

Example 15. The controller of examples 1-14 or any combination thereof, where the first node is configured to receive the first signal at least in part by receiving a first analog signal, and the second node is configured to receive the second signal at least in part by receiving a second analog signal.

Example 16. The controller of examples 1-15 or any combination thereof, where the processing circuitry is further configured to convert the first analog signal to a first digital signal, and the processing circuitry is configured to determine the target value for the second signal at least in part by setting a threshold level for the second analog signal based on the first digital signal. The processing circuitry is configured to generate the control signal at least in part by comparing the second analog signal and the threshold level.

Example 17. The controller of examples 1-16 or any combination thereof, where the processing circuitry is configured to control an output current of a flyback converter circuit.

Example 18. The controller of examples 1-17 or any combination thereof, where the processing circuitry is configured to control an output current of an alternating current to direct current (ACDC) converter circuit.

Example 19. The controller of examples 1-18 or any combination thereof, where the processing circuitry is configured to control an output current of a USB-PD device.

Example 20. A method for generating a control signal for a primary-side switch in a power converter circuit, where the method includes receiving, by a controller on a primary side of the power converter circuit, a first signal indicating a current or a voltage through a primary side of a transformer of the power converter circuit. The method also includes receiving, by the controller, a second signal indicating a current or a voltage through the primary-side switch. The method further includes determining, by the controller, a target value for the second signal based on the first signal and generating, by the controller, the control signal for the primary-side switch based on the target value for the second signal.

Example 21. The method of example 20, wherein generating the control signal includes controlling an output current of the power converter circuit.

Example 22. The method of examples 20-21 or any combination thereof, further including determining an offset value based on a function including the first signal as an input variable.

Example 23. The method of examples 20-22 or any combination thereof, where determining the target value for the second signal is based on the offset value.

Example 24. The method of examples 20-23 or any combination thereof, further including determining a limit for an output current of the power converter circuit and determine a gradient of the function based on the limit.

Example 25. The method of examples 20-24 or any combination thereof, further including determining a limit for an output current of the power converter circuit and determine a gradient of the function based on the limit.

Example 26. The method of examples 20-25 or any combination thereof, further including determining a gradient of the function at least in part by associating a first value of the first signal with a zero value for the offset value, and associating a second value of the first signal with maximum value of the offset value, and determining the gradient based on the first value of the first signal, the zero value for the offset value, the second value of the first signal, and the maximum value of the offset value.

Example 27. The method of example 26, where determining the target value for the second signal includes determining a larger modification for the second signal in a first instance when first signal includes the first value than in a second instance when the first signal includes the second value.

Example 28. The method of examples 26-27 or any combination thereof, where the first value of the first signal is greater than the second value of the first signal.

Example 29. The method of examples 26-28 or any combination thereof, further including determining the zero value of the offset value, the maximum value of the offset value, the first value of the first signal, or the second value of the first signal based on the user input.

Example 30. The method of examples 20-29 or any combination thereof, where determining the offset value based on the function includes determining the offset value such that the offset value and the first signal are inversely proportional.

Example 31. The method of examples 20-30 or any combination thereof, where determining the target value for the second signal includes adding the offset value to the first signal or subtracting the offset value from the first signal.

Example 32. The method of examples 20-31 or any combination thereof, further including sampling the first signal while the primary-side switch is turned off, and determining the target value for the second signal is based on the sampled first signal.

Example 33. The method of examples 20-32 or any combination thereof, further including determining a threshold level based on the target value for the second signal, and generating the control signal includes turning off the primary switch when the second signal is greater than the threshold level.

Example 34. The method of examples 20-33 or any combination thereof, where receiving the first signal includes receiving a first analog signal, and receiving the second signal includes receiving a second analog signal.

Example 35. The method of examples 20-34 or any combination thereof, further including converting the first analog signal to a first digital signal, and determining the target value for the second signal includes setting a threshold level for the second analog signal based on the first digital signal. In addition, generating the control signal includes comparing the second analog signal and the threshold level.

Example 36. The method of examples 20-35 or any combination thereof, further including controlling an output current of a flyback converter circuit.

Example 37. The method of examples 20-36 or any combination thereof, further including controlling an output current of an alternating current to direct current (ACDC) converter circuit.

Example 38. The method of examples 20-37 or any combination thereof, further including controlling an output current of a USB-PD device.

Example 39. A device includes a computer-readable medium having executable instructions stored thereon, configured to be executable by processing circuitry for causing the processing circuitry to receive a first signal indicating a current or a voltage through a primary side of a transformer of a power converter circuit. The instructions further cause the processing circuitry to receive a second signal indicating a current or a voltage through a primary-side switch in the power converter circuit. The instructions also cause the processing circuitry to determine a target value for the second signal based on the first signal. In addition, the instructions cause the processing circuitry to generate a control signal for the primary-side switch based on the target value for the second signal.

Example 40. The device of example 39, wherein the instructions further cause the processing circuitry to perform the method of examples 20-38 or any combination thereof.

Example 41. A power converter circuit including a transformer including a primary side and a secondary side, a primary-side switch coupled to the primary side of the transformer, and the controller of examples 1-19 or any combination thereof.

This disclosure has attributed functionality to controllers 110 and 410 and processing circuitry 312 and 412. Controllers 110 and 410 and processing circuitry 312 and 412 may include one or more processors. Controllers 110 and 410 and processing circuitry 312 and 412 may include any combination of integrated circuitry, discrete logic circuitry, analog circuitry, such as one or more microprocessors, digital signal processors (DSPs), application specific integrated circuits (ASICs), and/or field-programmable gate arrays (FPGAs). In some examples, controllers 110 and 410 and processing circuitry 312 and 412 may include multiple components, such as any combination of one or more microprocessors, one or more DSPs, one or more ASICs, or one or more FPGAs, as well as other discrete or integrated logic circuitry, and/or analog circuitry.

The techniques described in this disclosure may also be embodied or encoded in an article of manufacture including a non-transitory computer-readable storage medium, such as memory 414. Example non-transitory computer-readable storage media may include RAM, ROM, programmable ROM (PROM), erasable programmable ROM (EPROM), electronically erasable programmable ROM (EEPROM), flash memory, a hard disk, a compact disc ROM (CD-ROM), a floppy disk, a cassette, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A controller configured to control a primary-side switch in a power converter circuit, the controller comprising:
   a first node configured to receive a first signal indicating a current or a voltage through an auxiliary winding on a primary side of a transformer of the power converter circuit;
   a second node configured to receive a second signal indicating a current or a voltage through the primary-side switch of the power converter circuit; and
   processing circuitry configured to:
      control the primary-side switch using peak current control based on a target value for the second signal;
      determine an offset value based on a function including the first signal as an input variable;
      determine the target value for the second signal based on the first signal and based on the offset value; and
      generate a control signal for the primary-side switch to perform the peak current control by:
         turning on the primary-side switch in response to determining that an amplitude of the second signal is less than an amplitude of the target value for the second signal; and
         turning off the primary-side switch in response to determining that the amplitude of the second signal is greater than the amplitude of the target value for the second signal.

2. The controller of claim 1, wherein the processing circuitry is configured to control an output current of the power converter circuit at least in part by generating the control signal to maintain the output current below a threshold current level.

3. The controller of claim 1, wherein the processing circuitry is further configured to:
   receive a user input; and
   determine a gradient of the function based on the user input.

4. The controller of claim 1, wherein the processing circuitry is further configured to:
   determine a limit for an output current of the power converter circuit; and
   determine a gradient of the function based on the limit.

5. The controller of claim 1, wherein the processing circuitry is further configured to determine a gradient of the function at least in part by:
   associating a first value of the first signal with a zero value for the offset value; and
   associating a second value of the first signal with a maximum value of the offset value; and
   determining the gradient based on the first value of the first signal, the zero value for the offset value, the second value of the first signal, and the maximum value of the offset value.

6. The controller of claim 5, wherein the processing circuitry is further configured to determine the target value for the second signal at least in part by determining a larger modification for the target value for the second signal in a first instance when first signal includes the first value than in a second instance when the first signal includes the second value.

7. The controller of claim 5, wherein the processing circuitry is further configured to:
   receive a user input; and
   determine the first value of the first signal, the second value of the first signal, or the maximum value of the offset value based on the user input.

8. The controller of claim 1, wherein the processing circuitry is configured to determine the offset value based on the function at least in part by determining the offset value such that the offset value and the first signal are inversely proportional.

9. The controller of claim 1, wherein the processing circuitry is configured to determine the target value for the second signal at least in part by:
   adding the offset value to the first signal; or
   subtracting the offset value from the first signal.

10. The controller of claim 1,
   wherein the processing circuitry is further configured to sample the first signal while the primary-side switch is turned off, and
   wherein the processing circuitry is configured to determine the target value for the second signal based on the sampled first signal.

11. The controller of claim 1,
   wherein the first node is configured to receive the first signal at least in part by receiving a first analog signal,
   wherein the second node is configured to receive the second signal at least in part by receiving a second analog signal, wherein the processing circuitry is further configured to convert the first analog signal to a first digital signal, wherein the processing circuitry is configured to determine the target value for the second signal at least in part by setting a threshold voltage level for the second analog signal based on the first digital signal, and wherein the processing circuitry is configured to generate the control signal at least in part by comparing the second analog signal and the threshold voltage level.

12. The controller of claim 11, wherein the processing circuitry is configured to determine the target value for the signal by:
subtracting the offset value from the first digital signal; or
adding the offset value to the first digital signal.

13. The method of claim 11, wherein determining the offset value comprises determining the offset value at a rate that is less than a switching frequency of the control signal.

14. The controller of claim 1, wherein the processing circuitry is configured to determine the offset value at a rate that is less than a switching frequency of the control signal.

15. A method for generating a control signal for a primary-side switch in a power converter circuit, the method comprising:
receiving, by a controller on a primary side of the power converter circuit, a first signal indicating a current or a voltage through an auxiliary winding on a primary side of a transformer of the power converter circuit;
receiving, by the controller, a second signal indicating a current or a voltage through the primary-side switch;
controlling the primary-side switch using peak current control based on a target value for the second signal;
determining an offset value based on a function including the first signal as an input variable;
determining, by the controller, the target value for the second signal based on the first signal and based on the offset value; and
generating, by the controller, the control signal for the primary-side switch to perform the peak current control by:
turning on the primary-side switch in response to determining that an amplitude of the second signal is less than an amplitude of the target value for the second signal; and
turning off the primary-side switch in response to determining that the amplitude of the second signal is greater than the amplitude of the target value for the second signal.

16. The method of claim 15, wherein generating the control signal comprises controlling an output current of the power converter circuit to maintain the output current below a threshold current level.

17. A device comprising a computer-readable medium having executable instructions stored thereon, configured to be executable by processing circuitry for causing the processing circuitry to:
receive a first signal indicating a current or a voltage through an auxiliary winding on a primary side of a transformer of a power converter circuit;
receive a second signal indicating a current or a voltage through a primary-side switch in the power converter circuit;
control the primary-side switch using peak current control based on a target value for the second signal;
determine an offset value based on a function including the first signal as an input variable;
determine the target value for the second signal based on the first signal and based on the offset value; and
generate a control signal for the primary-side switch to perform the peak current control by:
turning on the primary-side switch in response to determining that an amplitude of the second signal is less than an amplitude of the target value for the second signal; and
turning off the primary-side switch in response to determining that the amplitude of the second signal is greater than the amplitude of the target value for the second signal.

18. The device of claim 17, wherein the instructions to generate the control signal comprise instructions to control an output current of the power converter circuit to maintain the output current below a threshold current level.

19. The device of claim 17, wherein the instructions further cause the processing circuitry to determine a gradient of function at least in part by:
associating a first value of the first signal with a zero value for the offset value; and
associating a second value of the first signal with a maximum value of the offset value; and
determining the gradient based on the first value of the first signal, the zero value for the offset value, the second value of the first signal, and the maximum value of the offset value.

20. The method of claim 19, wherein the instructions to determine the target value for the second signal comprise instructions to determine a larger modification for the second signal in a first instance when first signal includes the first value than in a second instance when the first signal includes the second value.

* * * * *